(12) United States Patent
Prakash et al.

(10) Patent No.: US 7,429,986 B2
(45) Date of Patent: Sep. 30, 2008

(54) METHOD OF DETERMINING RELATIVE Z-ORDERING IN AN IMAGE AND METHOD OF USING SAME

(75) Inventors: Adityo Prakash, Redwood Shores, CA (US); Eniko Fodor, Redwood Shores, CA (US); Edward Ratner, Sunnyvale, CA (US); David Cook, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 550 days.

(21) Appl. No.: 11/081,320

(22) Filed: Mar. 16, 2005
(Under 37 CFR 1.47)

(65) Prior Publication Data

US 2005/0156926 A1 Jul. 21, 2005

Related U.S. Application Data

(63) Continuation of application No. 09/922,299, filed on Aug. 3, 2001, now Pat. No. 6,900,802.

(60) Provisional application No. 60/223,057, filed on Aug. 4, 2000.

(51) Int. Cl.
*G06T 15/00* (2006.01)
(52) U.S. Cl. .................................. 345/421; 345/629
(58) Field of Classification Search ................. 345/421, 345/629, 473
See application file for complete search history.

(56) References Cited

U.S. PATENT DOCUMENTS

| 6,278,466 | B1 * | 8/2001 | Chen .......................... 345/473 |
| 6,384,826 | B1 * | 5/2002 | Bern et al. ................... 345/441 |

* cited by examiner

*Primary Examiner*—Almis R. Jankus
(74) *Attorney, Agent, or Firm*—Okamoto & Benedicto LLP

(57) ABSTRACT

In one embodiment according to the present invention, relative z-ordering of segments in a digital image is determined. A method comprises forward and backward motion matching of image regions to determine overlap, followed by the creation of relationships (e.g., pairwise relationships) between regions and comparing the result with the original image to determine the relative z-ordering.

13 Claims, 9 Drawing Sheets

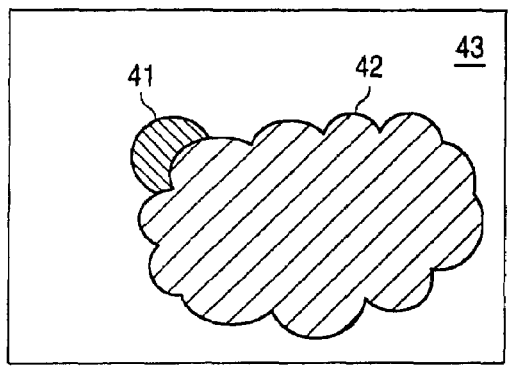
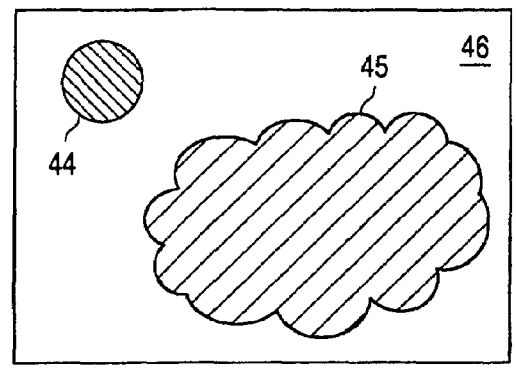
FIG. 4a  FIG. 4b
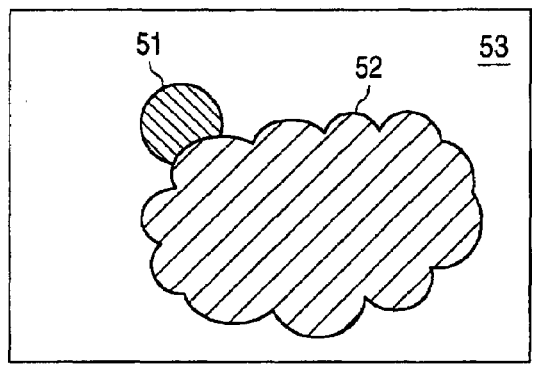
FIG. 5
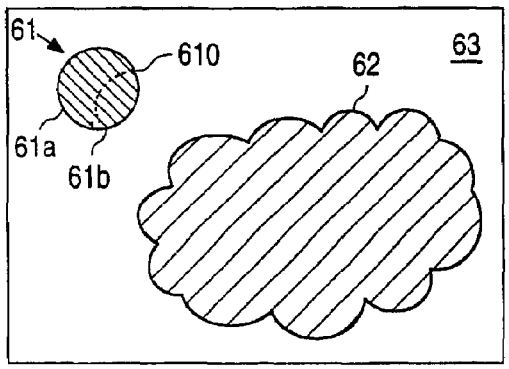
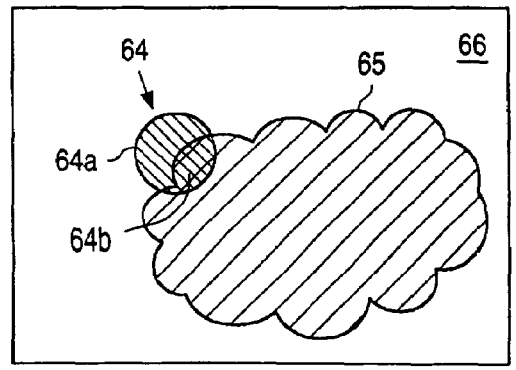
FIG. 6a  FIG. 6b

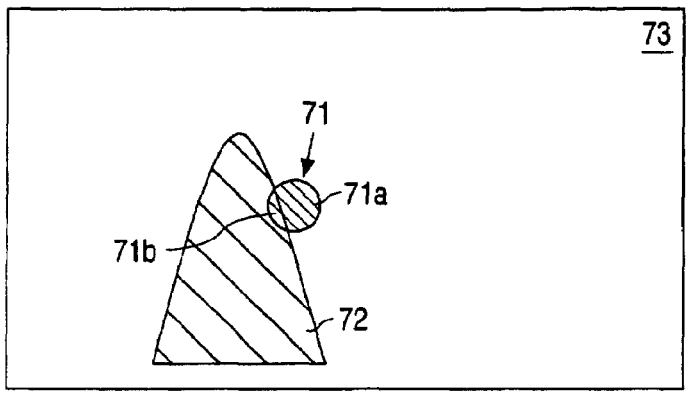
FIG. 7a
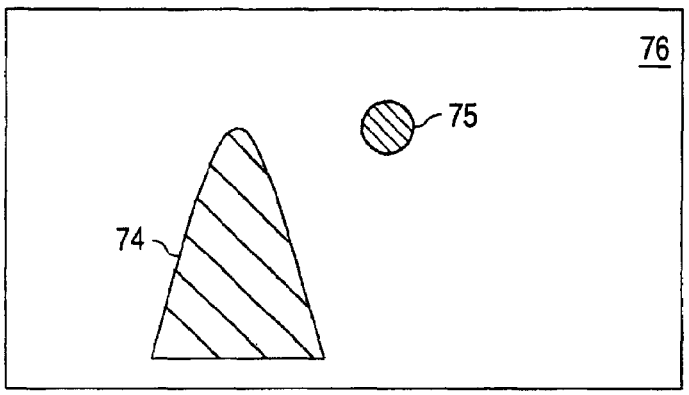
FIG. 7b
FIG. 8a
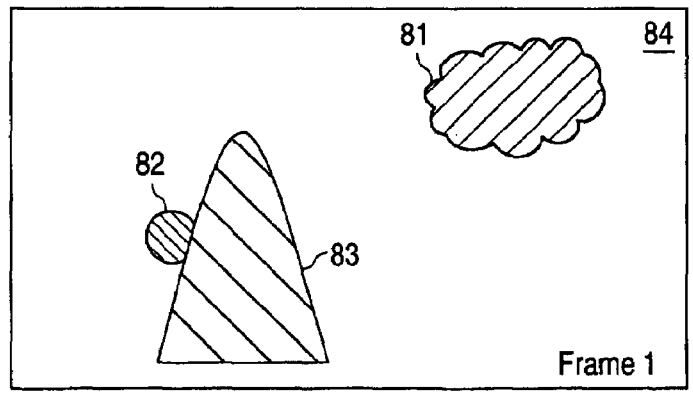
FIG. 8b
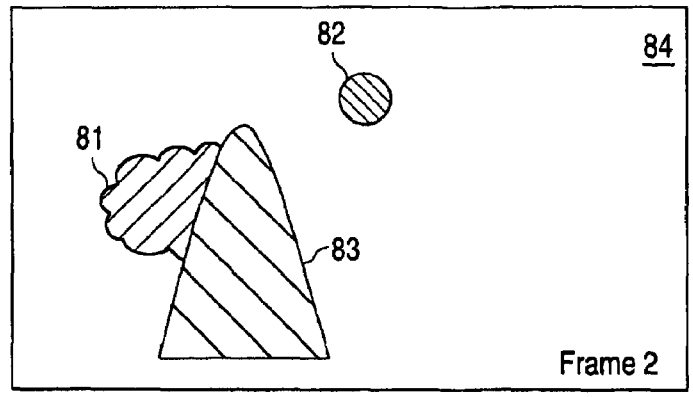

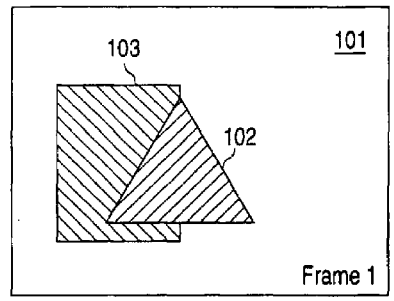
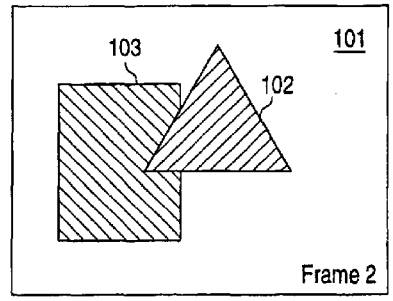
FIG. 10a(1)      FIG. 10a(2)
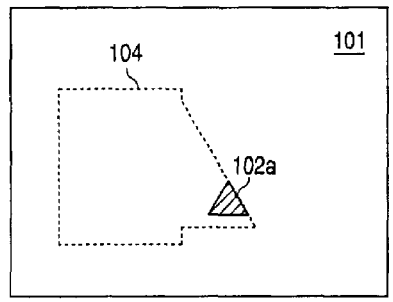
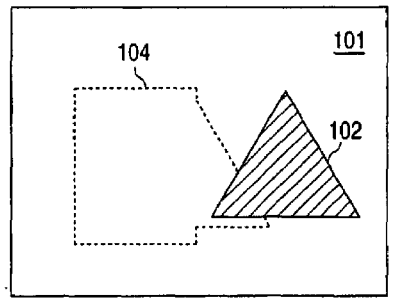
FIG. 10b      FIG. 10c
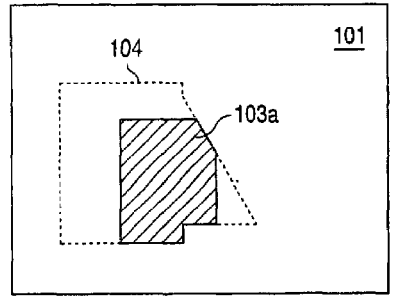
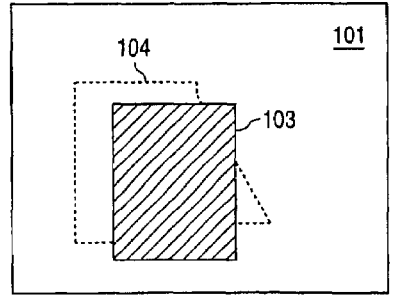
FIG. 10d      FIG. 10e

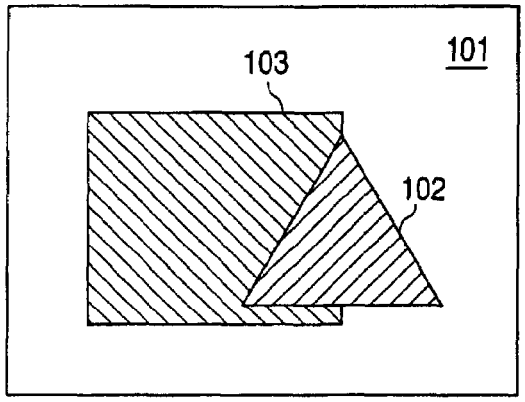 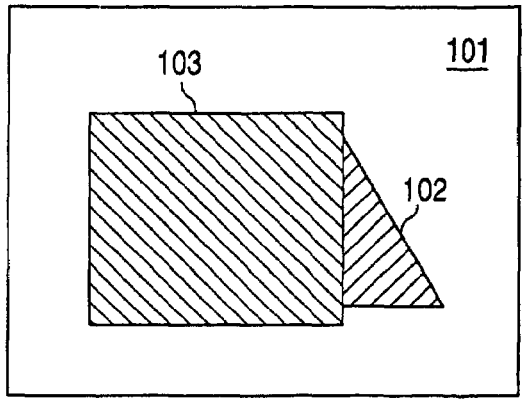
FIG. 10f FIG. 10g
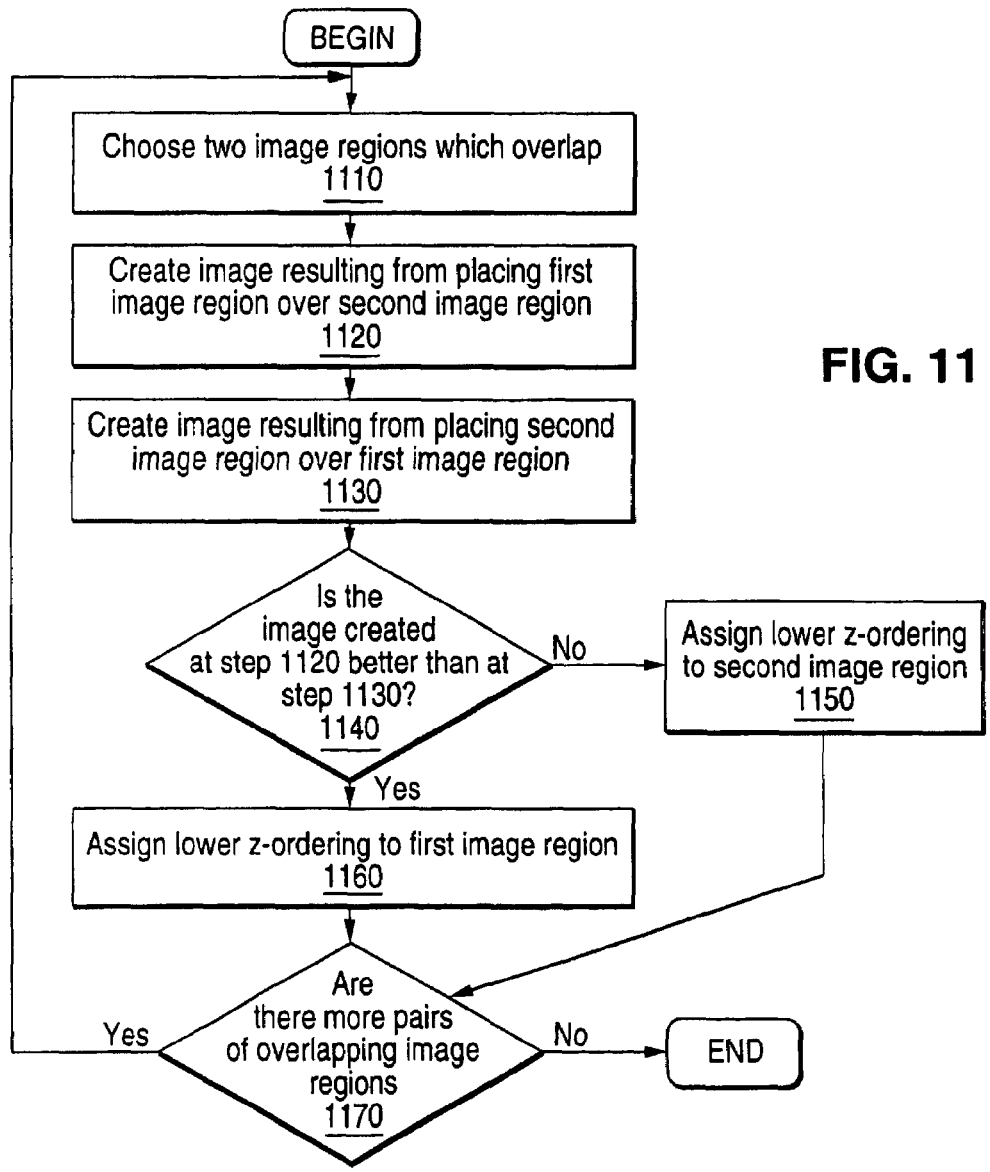
FIG. 11

METHOD OF DETERMINING RELATIVE Z-ORDERING IN AN IMAGE AND METHOD OF USING SAME

CROSS-REFERENCES TO RELATED APPLICATIONS

The present disclosure is related to the following:

U.S. Pat. No. 6,778,698, issued Aug. 17, 2004 from U.S. patent application No. 09/591,438, filed Jun. 9, 2000, and entitled "Method and Apparatus for Digital Image Segmentation"; and U.S. Pat. No. 6,584,213, issued Jun. 24, 2003 from U.S. patent application No. 09/912,743, filed Jul. 23, 2001, and entitled "Motion Matching Method."

The present application claims the benefit of:

U.S. Provisional Patent Application No. 60/223,057, filed Aug. 4, 2000 by Adityo Prakash et al., and entitled "Method of Determining Relative Z-Ordering in an Image and Method of Using Same."

The present application is a continuation of:

U.S. patent application No. 09/922,299, filed Aug. 3, 2001 by Adityo Prakash et al., now U.S. Pat. No. 6,900,802 and entitled "Method of Determining Relative Z-Ordering in an Image and Method of Using Same."

The disclosures of each of the above-referenced patent applications are hereby incorporated by reference in their entirety.

BACKGROUND OF THE INVENTION

The present invention relates in general to image processing, and in particular to identifying relative z-values between segments found in an image and using the relative overlap information in digital image processing.

The solution disclosed herein is to determine the z-ordering information contained within a sequence of image frames that are temporally correlated. Z-ordering literally means to order by the "z", or depth axis. In other words, z-ordering means sequencing, or ordering, the image regions based upon how deep within the image frame they are. In this convention, Bordering is measured from the viewer's perspective. Therefore, the further away an image region, or the deeper it is within an image frame, the higher the z-value of that region.

Determining the z-order or depth of different regions of an image is very useful for applications such as digital image manipulations, image/video editing, video compression and various other digital image processing applications.

In general, knowing the z-order of different objects within an image allows the video frames to be edited or manipulated because it now becomes possible to remove or add objects to this sequence of image frames without the loss of image integrity or image quality. Currently no methods exist that can satisfactorily identify the z-order of arbitrary objects within a temporally correlated image sequence.

Z-ordering, as applied in this patent, represents an entirely new technology. There is currently no widely available technology that permits the determination of z-ordering information, from an arbitrarily chosen sequence of digital image frames, without human intervention. Current z-ordering routines are limited to the reverse application; i.e. drawing an image frame after the z-ordering is known. For example, in FIG. 1, there are three image regions to be drawn, a cloud, the sun, and the background regions 11 through 13 respectively. If the cloud has the z-ordering 1, the sun z-ordering 2, and the background, z-ordering 3, the image drawing routine knows to draw the background first, then the sun, and finally the cloud.

SUMMARY OF THE INVENTION

This invention relates to a method and apparatus for determining the relative z-ordering of the image regions in an image frame, given a sequence of image frames. This invention operates by understanding that with multiple frames, some portion of the hidden parts of the image regions may become visible, thus allowing the relative z-order of the different image regions. The basis of this invention is that by comparing two or more image regions that overlap in a particular image frame, with the same image regions in a different image frame where they do not overlap, it is possible to determine the relative z-ordering of the image regions. This is illustrated in FIG. 2a and 2b. Referring to FIG. 2a, there are two arbitrary image regions marked image region 21 and 22 respectively. FIG. 2a by itself does not contain enough information to determine which image region is occluding the other. Referring to FIG. 2b, a second image frame, which shows the complete unoccluded image regions 21 and 22. It is apparent that image region 21 was partially occluding image region 22, in FIG. 2a.

BRIEF DESCRIPTION OF THE DRAWINGS

FIGS. 4a and 4b illustrate how motion matching is used to determine the structure of hidden segments.

FIG. 5 illustrate that motion matching is effective even when some parts of the two segments overlap.

FIGS. 6a and 6b. illustrate a sequence of two image frames where traditional motion matching routines will fail to identify a particular region when it is partially occluded.

FIGS. 7a and 7b illustrate a sequence of two image frames where traditional motion matching routines will successfully identify a particular region.

FIG. 8 is a sequence of two image frames where backward motion matching is to be applied.

FIGS. 10a-10g illustrate a process of pairwise comparisons of regions (segments).

FIG. 11 is a flow diagram of the process of error minimization.

DESCRIPTION OF THE SPECIFIC EMBODIMENTS

Figure 1:
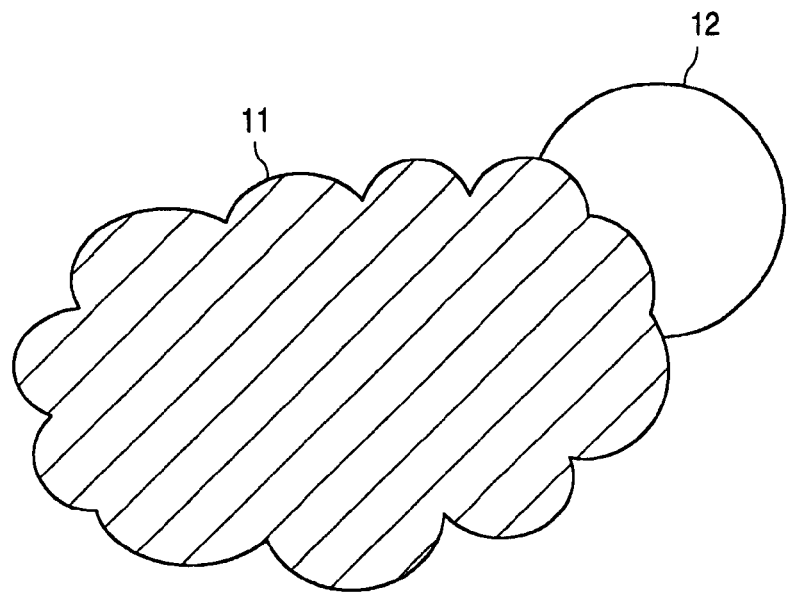
FIG. 1 is an image frame containing three objects with known relative z-order.

With reference to the exemplary drawings wherein like reference numerals indicate like or corresponding elements among the figures, embodiments of a system according to the present invention will now be described in detail. It should be noted that the terms "segment" and "region" are used interchangeably herein.

Figure 3:
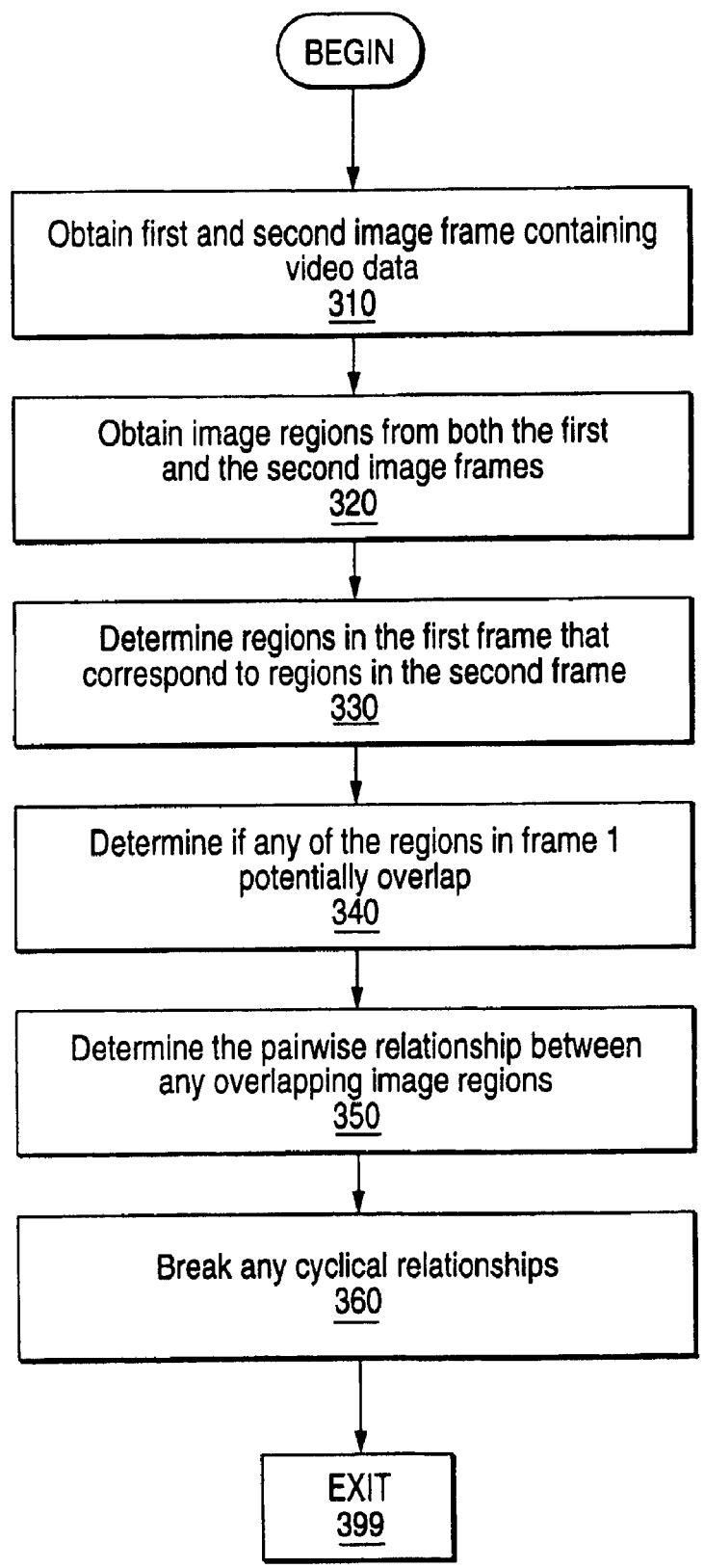
FIG. 3 is a flowchart of a z-ordering process.

FIG. 3. illustrates the overall flow diagram from the invention described herein. At step 310, the invention obtains a first and second image frame containing video data. At step 320, the invention obtains the image regions from both the first and second image frames. In one embodiment of the invention, and without limitations to any other embodiments, the image regions are segments.

At step 330, motion matching is performed on the image regions to determine corresponding image regions in the first and second image frame. Step 340 determines if any of the frame 1 image regions potentially overlap. Step 350 determines the pairwise relationship between any overlapping image regions. At step 360, any cyclical relationships are broken. The invention ends at step 399.

Motion Matching

FIG. 4 illustrates how motion matching or is used to determine the structure of the hidden image regions. Motion matching is the process of determining which image region, within an image frame, given a collection of image frames, most closely resembles the given image region. The invention uses motion matching to determine the structure of the hidden portions of the various image regions.

FIG. 4a is composed of three image regions, the sun, the cloud, and the background marked image regions 41, 42 and 43, respectively. The sun is partially hidden behind the clouds. FIG. 4b is also composed of three image regions, the sun, the clouds, and the background marked image regions 44, 45 and 46, respectively. In FIG. 4b, unlike FIG. 4a, the sun is fully visible, i.e. not occluded by the cloud.

The invention applies the matching routines and determines that image region 41, the sun in FIG. 4a, is matched with image region 44, the sun in FIG. 4b. Once the invention has made this determination, it can determine more of the structure of image region 41, the partially hidden sun, to wit: since image region 41 and image region 44, represent the same collection of pixels. The hidden, unknown portions of image region 41, are identical to the corresponding visible portions of image region 44, therefore at least some of the previously unknown portions of image region 44 have been determined through the use of motion matching, (i.e. the newly visible portions of the image region).

Further, the principle applies even if the sun in FIG. 4b, image region 42, remained partially occluded. For example, in FIG. 5, the are three image regions, the sun, the clouds, and the background marked image regions 51 through 53, respectively. As shown, the sun is partially hidden behind the clouds, although it is less hidden than in FIG. 4a. Applying a motion matching routine will match image region 41 with image region 51. Once again, the hidden, unknown portions of image region 41 are identical to the corresponding portions of image region 51 which are visible.

Forward Motion Matching

FIG. 6 illustrates the limitations of most traditional motion matching routines. Specifically, they are limited to the situations where an image region remains essentially the same, or the image region becomes less occluded, i.e. parts of the previously hidden portion of the image region becomes visible, without any of the visible portions becoming occluded. All other circumstances will confound most motion matching routines. This occurs because the motion matching routines do not have access to the newly hidden portions of the image region.

FIG. 6a is composed of three image regions, the sun, clouds, and the background, marked image region 61 through 63, respectively. FIG. 6b is composed of three image regions, the sun, clouds, and the background. Unlike FIG. 6a, the cloud is partially blocking the sun in FIG. 6b. It is conceptually useful to consider image region 64, the sun in FIG. 6b, as two image sub-regions, sub-region 64a, the visible portion and sub-region 64b, the hidden portion. A sub-region is any subset of an image region. Similarly, image region 61, the sun in FIG. 6a, may be considered to be composed of sub-regions 61a and 61b, which respectively correspond to sub-regions 64a and 64b. Line 610 refers to the conceptual separation between sub-regions 61a and 61b.

The matching routines can match the pixel values in sub-region 61a with the pixel values in sub-region 64a. However, the remaining pixel values of image region 61, (i.e. sub-region 61b), will not be matched with the remaining pixel values in image region 64 (i.e. sub-region 64b) since those pixel values are hidden and therefore inaccessible to the matching routines.

The consequence of the pixel values in sub-region 64b being inaccessible to the matching routines is that most motion matching routines will reject image regions 61 and 64 as matches.

Figure 2A:
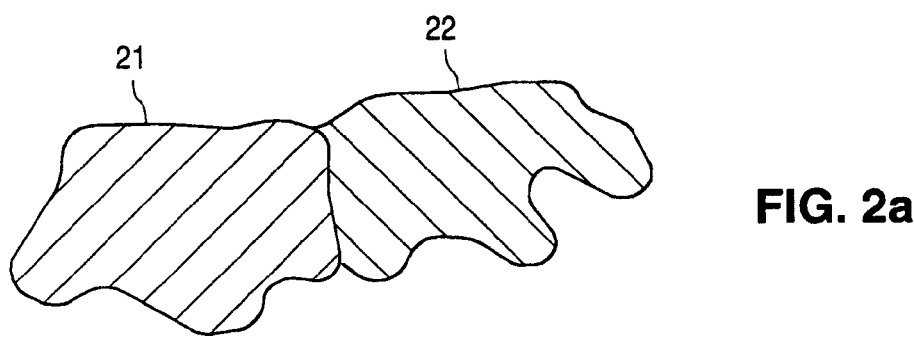
FIG. 2a is an image frame containing two overlapping regions
Figure 2B:
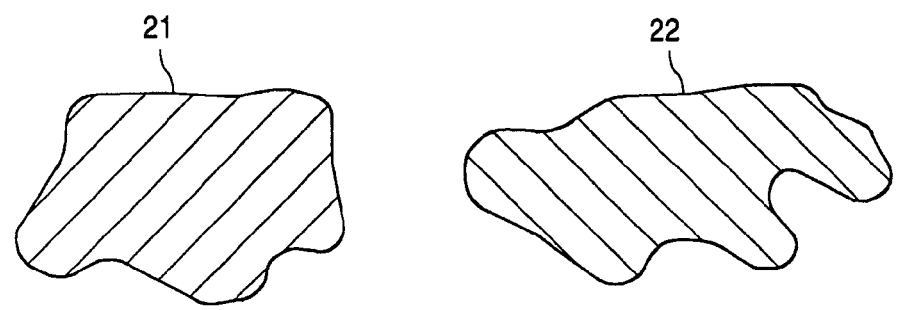
FIG. 2b is an image frame where the two regions no longer overlap

Mathematically speaking, traditional motion matching routines will not match a region in frame 1 to a subset, i.e. smaller portion, of the region in FIG. 2.

Backward Motion Matching

FIG. 7. illustrates an alternative application of motion matching. As previously explained, a forward application of a motion matching routine will not match an image region with a subset of the same image region. However, the converse is not true. Most motion matching routines will match an image region with a superset of the image region. A superset of the image region, as used herein, refers to an image region, containing at least all of the pixels of the first image region.

Referring to FIG. 7a, which contains three image regions, the sun, a mountain, and the background, marked image regions 71 through 73, respectively, the rising sun, image region 71, is partially hidden behind the mountain. Similarly, FIG. 7b also contains three image regions, the rising sun, the mountain, and the background, regions 74 through 76, respectively. The rising sun is no longer hidden behind the cloud.

The partially hidden sun in FIG. 7a may be considered as 2 image sub-regions, the visible portion, and the hidden portion, sub-regions 71a and 71b respectively. When the matching routine attempts to find a match for image region 71 in FIG. 7b, it can only consider the pixels in sub-region 71a as the pixels in sub-region 71b are hidden and therefore are not considered. In the given example, each pixel in sub-region 71a has a corresponding pixel in region 74 and thus a match is found.

Application of Backward Motion Matching

In one embodiment, the invention applies the matching routines backwards. That is, instead of matching from an image region in frame 1 to an image region in frame 2, the invention is given an image region from frame 2 and matches it with an image region in frame 1.

Backward matching takes advantage of the fact that most motion matching algorithms will not match an image region with a subset of the image region as shown in FIGS. 6a and 6b. However, most motion matching algorithms will match an image region with a superset of the same image region, as shown in FIGS. 7a and 7b.

As an image region moves from one frame to the next, it may become more occluded, less occluded, or remain the same. Since image regions, which become more occluded, cannot be matched using forward motion matching methods, they must be matched using backwards matching. Image regions, which become less occluded or remain the same, may be matched using forward matching.

Thus, after the forward motion matching routines have identified the image regions, which do not become more occluded in frame 2, the invention uses backwards motion matching to match the remaining image regions.

For example, as seen in FIG. 8, there are four image regions. These image regions, respectively designated regions 81 through 84, are a cloud, the sun, a mountain, and the background. In frame 1, only the sun is partially occluded. However, in frame 2, the sun is no longer occluded, but the cloud is. Forward motion matching will match the mountain in both frames, as the mountain is unchanged. Additionally, the sun will be matched, as the sun in frame 1 is a subset of the sun in frame 2, i.e. the sun became less occluded in frame 2. However, the cloud will not be matched.

Backward matching will attempt to match the unmatched cloud in frame 2 with an image region in frame 1. Since the frame 2 cloud is a subset of the frame 1 cloud, the matching routine, applied backwards, will designated the clouds as a match.

Flow Diagram of Matching

Figure 9:
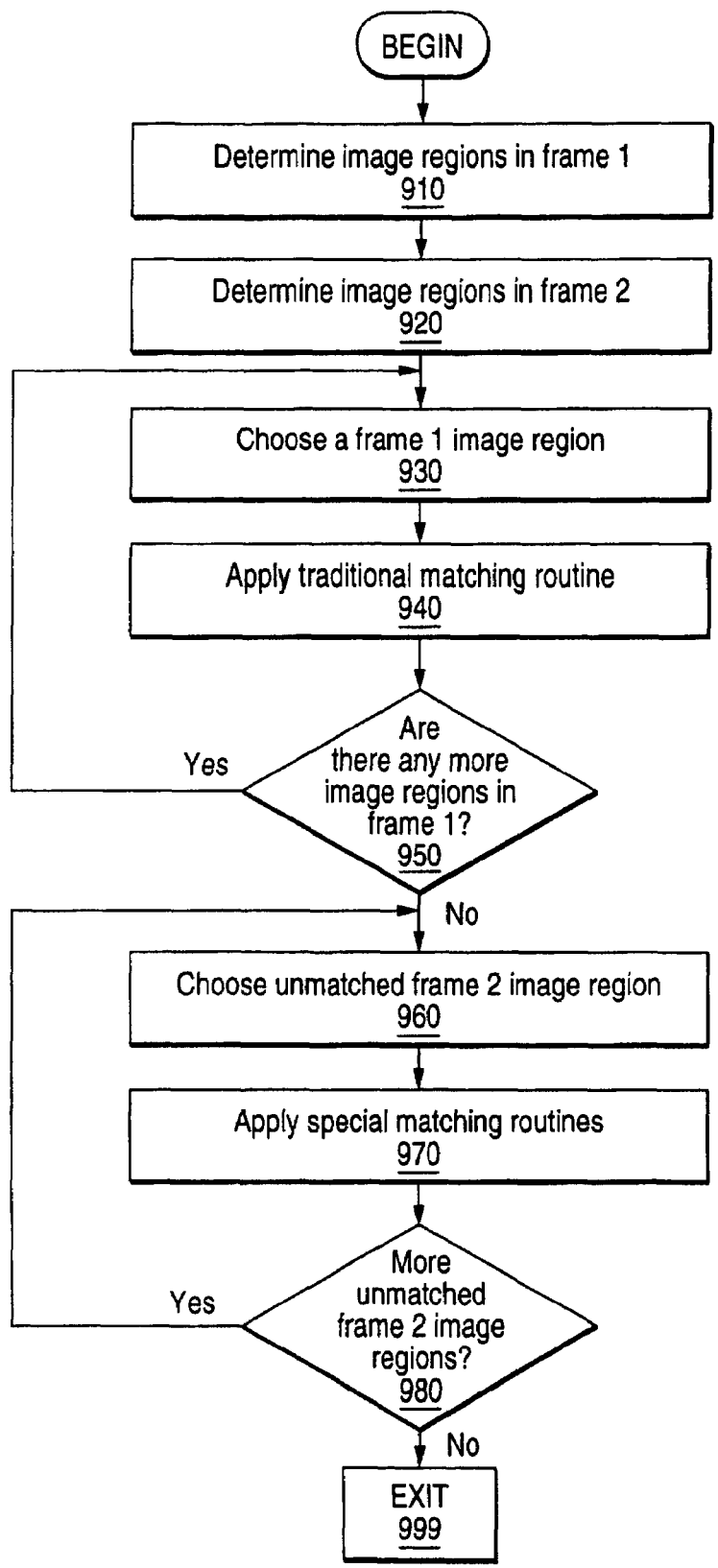
FIG. 9 is a flow diagram of forward and forward and backward motion matching.

Referring to FIG. 9, at step 910 the invention determines the image regions in frame 1. Similarly, at step 920, the frame 2 image regions are determined. At step 930, an image region from frame 1 is chosen and a traditional matching routine is applied at step 940. After matching, at step 950, the invention determines if there are any more frame 1 image regions to be matched. If so, then the routine proceeds to step 930, otherwise the invention continues at step 960 where an unmatched frame 2 image region is chosen. The new matching routines are applied backwards at step 970. At step 980, the invention determines if there are any more unmatched frame 2 image regions. If so, then the invention proceeds to step 960, otherwise the invention continues at step 999.

Error Minimization

FIG. 10 illustrates the method of error minimization. Once the image regions have been matched, the invention computes the z-ordering information using a procedure known as error minimization. Error minimization is the process where the invention considers two image regions that overlap, given a collection of overlapping image regions within the same image frame, and determines which of the two image regions partially occludes the other. This results in a pairwise relationship between the two image regions. In this convention, the occluding image region has lower z-order than the occluded image region. Error minimization is applied to each pair of overlapping image regions within the collection of overlapping image regions. The objective is to create a sequence of pairwise relationships. These pairwise relationships can form either a transitive or cyclical relationship.

When the pairwise relationships of a collection of overlapping image regions form a transitive relationship, then the z-ordering of the image regions is the same as the transitive relationship. A transitive relationship is one where, after all of the pairwise orders have been determined, all of the regions can be ordered along the z-axis and assigned relative depths. For example in FIG. 10*a* if the pairwise relationships determined that image region 102 is on top of 103, 103 is on top of 101 and 102 is on top of 101, it is possible to determine that 102 is over 103 is over 101. This would be considered a transitive relation ship. If on the contrary, the pairwise relationships determine that 102 is on top of 103, 103 is on top of 101 and 101 is on top of 102, this would create a cyclical relationship because it would not be possible to order these regions along a z-axis. When such a cyclical relationship occurs, the exact z-ordering cannot be determined, a method called cycle breaking is invoked to determine the z-ordering of the collection of image regions. The method of cycle breaking will be described in detail in a later section.

As described earlier FIG. 10*a*, there are three image regions, the background, the triangle, and the square, respectively marked regions 101, 102, and 103, each of which share common pixels as determined by the relative motions of these segments between the two frames. In order to determine the pairwise relationships, the routine picks two image regions, which share common pixels. It computes the result of placing the first image region over the second image, then placing the second image region over the first image. The resulting two images are compared with the original image and the better match determines the pairwise relationship. In one embodiment the match is determined by comparing the two resulting images with the original image pixel by pixel and computing the lowest average error between the two images. In other embodiments of this invention, any other statistical parameter can be used as the criterion for determining the best match. The invention is also not limited to comparing only 2 image regions, it can consider any number of image regions at once.

In FIG. 10*b*, the invention starts with regions 101 and 102 and creates an image frame comprised of region 101 placed over region 102. In FIGS. 10*b, c, d* and *e*, the area 104 is an empty space or hole created by removing the triangle 102 rectangle 103 from FIG. 10*a* frame 1. For the purposes of the description in FIG. 10, all subsequent steps assume that the background with all other regions removed, can still be matched with itself. The small part of triangle 102, visible from under 101 is marked 102*a*. The next image will be region 102 drawn over region 101, which yields a triangle on the background as illustrated in FIG. 10*c*. Since region 102 over region 101 is the better match, region 102 has lower z-order than region 101.

Next, the invention compares regions 101 and 103. FIG. 10*d* illustrates the result of region 101 (the background) drawn over region 103 (the square). This yields the region 101 containing the above mentioned hole marked 104 and parts of 103 visible from underneath 101. Conversely, FIG. 10*e* illustrated that drawing region 103 over region 101 yields the square and the background, which is the closer match to FIG. 10*a*. Thus, region 103 has a lower z-order than region 101.

All that remains is to determine the pairwise relationship between regions 102 and 103. The invention creates an image of region 102 placed over region 103, which yields the result seen in FIG. 10*f*. Then the invention creates an image, FIG. 10*g*, of region 103 placed over region 102. Region 102 over region 103 yields the better match to the first frame and thus region 102 has lower z-order than region 103. Putting the three image regions together we determined that region 102 has lower z-order than region 103 which has lower z-order than region 101. Since this relationship is a transitive relationship, region 102 occludes region 103 which occludes region 101 and the z-ordering is determined.

Figure 15:
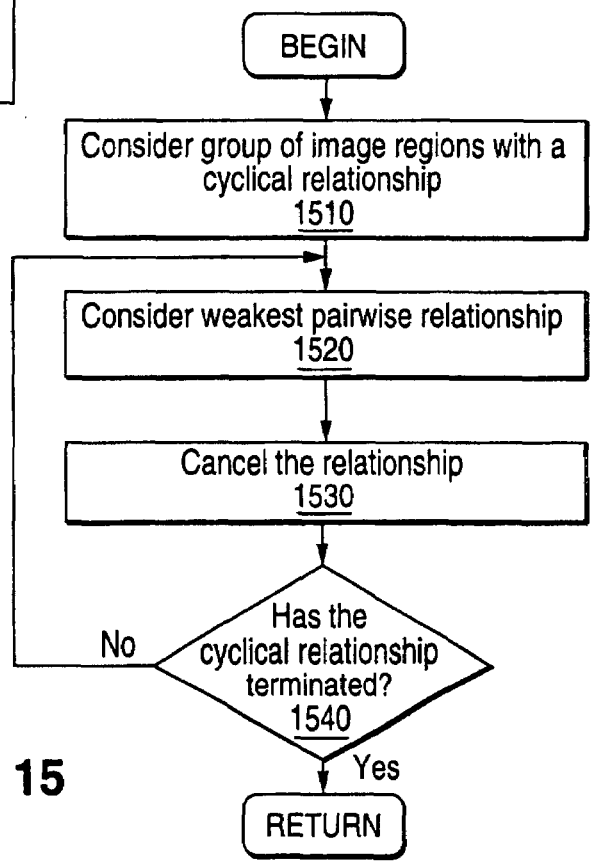
FIG. 15 is a flow diagram of cycle breaking

Referring to FIG. 11, at step 1110, the invention considers a group of image regions which overlap. Two image regions which overlap are chosen at step 1120. At step 1130, the routine applies error minimization, i.e. determining whether placing the first image region over the second is a closer match to the original image than placing the second image region over the first. Step 1140 uses the result of step 1130 to create a pairwise relationship between the two image regions. Step 1150 inquires if there are any more overlapping image regions. If so the invention jumps to step 1120, else it continues at step 1160. Step 1160 inquires if the pairwise relationships have formed a cyclical relationship (as explained fully in section 6). If so, the at step 1170, the cycle breaking routine at in FIG. 15 is executed, otherwise the routine continues at step 1180, which uses the pairwise relationships to create the z-ordering. At step 1190 the invention determines if there are any more groups of overlapping image regions. If so, the routine jumps to step 1110 and continues, else the invention ceases at step 1199.

Cycle Breaking.

Figure 12:
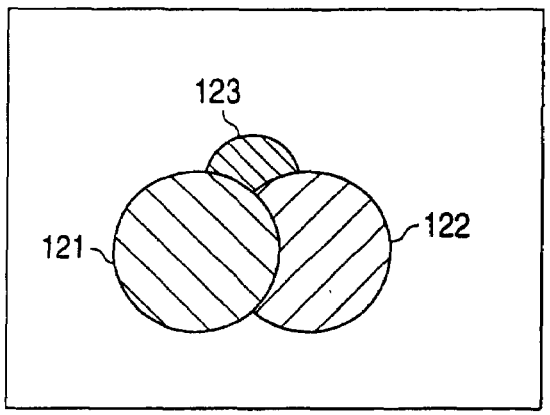
FIG. 12 illustrate a transitive relationship.

As explained previously, generally speaking, determining the pairwise relationships between the overlapping groups of image regions is sufficient to determine the z-ordering of the image regions. Generally, the pairwise relationship determines a transitive relationship as seen in FIG. 12. Where region 121 is over region 122, region 122 is over region 123 and therefore we know that region 121 is over also region 123.

However, sometimes the situation in FIG. 13, occurs. FIG. 13 represents three image regions, as shown, region 131 a light grey circle, region 132, a dark black circle, region 133 a medium grey circle. For this illustration we ignore the background since its inclusion only needlessly complicates matters.

Figure 13A:
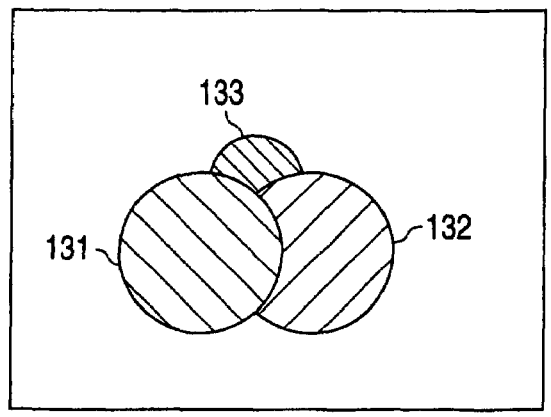
FIG. 13a-13g illustrate cycle breaking.
Figure 13B:
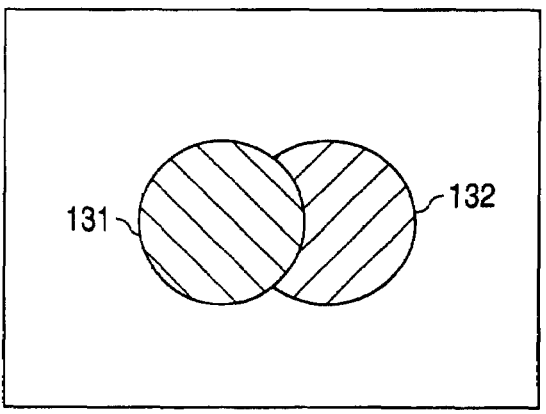
Figure 13C:
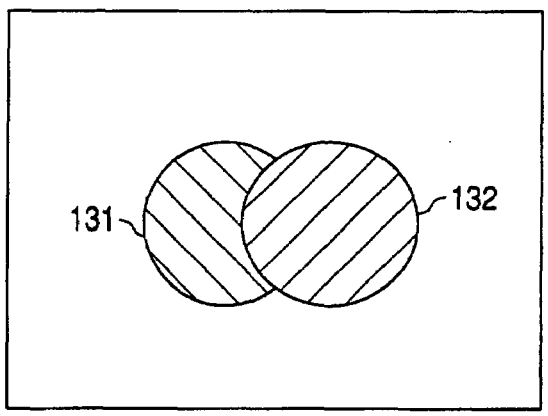
Figure 13D:
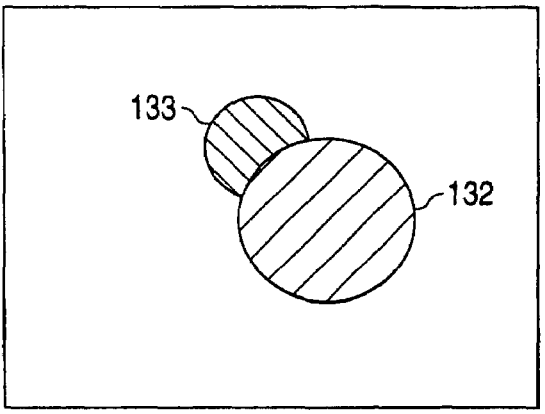
Figure 13E:
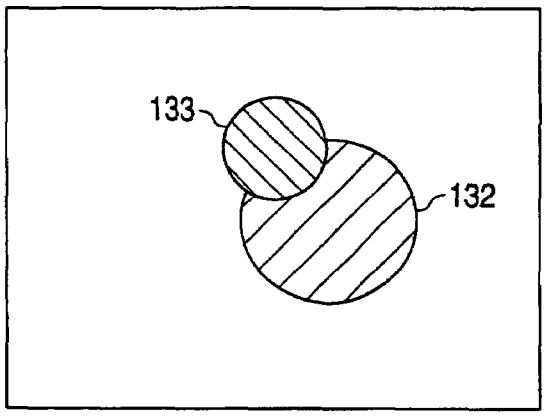
Figure 13F:
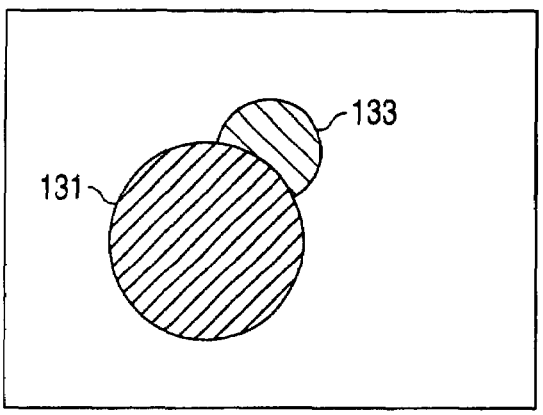
Figure 13G:
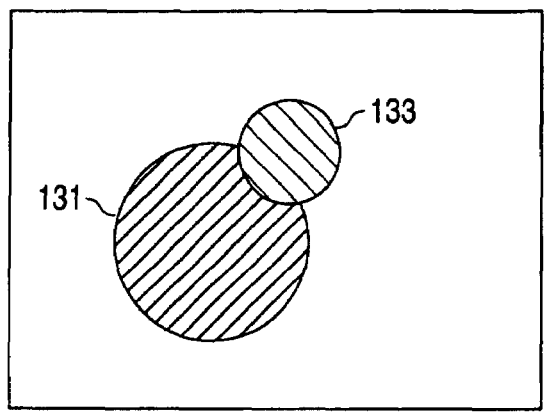

After applying the matching routines and the error mininization algorithms the results are the following pairwise relationships (See FIGS. 13*b-g*): image region 131 is over region 132; region 132 is over region 133; and region 133 is over region 131. Thus the image regions have a cyclical relationship as seen in FIG. 13*a*.

Figure 14:
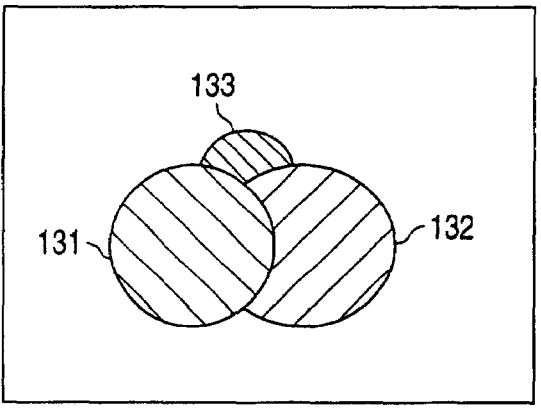
FIG. 14 illustrate the restoration of transitive relationship after cycle breaking

To turn this cyclical relationship into a transitive relationship so that the z-ordering can be obtained, the routine determines which pairwise relationship is the weakest. A pairwise relationship is considered weak when placing the first image region over the second image region and calculating the average error between this pair and the original image gives a similar a similar value as placing the second image over the first and calculating the average error between this pair and the corresponding region-pairs in the original image. In other words, if the difference between the two said average errors is small the pairwise relationship is considered weak. Therefore canceling the relationship does not significantly alter the final image. The invention cancels pairwise relationships beginning with the weakest, until the cyclical relationship is broken. In FIG. 13, the pairwise relationship between image region 133 and 131 is the weakest. The resulting pairwise relationships are: region 131 over region 132; region 132 over region 133. Thus a transitive relationship is formed and we know that region 131 is the closest to the viewer, i.e. has the lowest z-ordering, region 132 is deeper, having a higher z-ordering, and region 133 is deeper still, having the highest z-ordering. FIG. 14 illustrates the resulting image, which is nearly identical to FIG. 13.

Referring to FIG. 15, at step 1510, the invention considers a group of image regions with a cyclical relationship. At step 1520, the invention determines which pairwise relationship is the weakest. Step 1530 cancels the relationship.

At step 1540, the invention determines if the cyclical relationship is broken. If yes, the invention returns at step 1599, else the invention returns to step 1520 and considers the next weakest pairwise relationship until all cyclical relationships have been broken.

What is claimed is:

1. A method of determining local relative z-ordering information, the method comprising:
    (a) obtaining a first image frame and second image frame containing digital image data, wherein the first and second image frames comprise two frames from a temporally correlated sequence of frames;
    (b) dividing the first image frame and second image frame into segments, wherein a first segment overlaps a second segment in at least one of said image frames;
    (c) matching segments of the first image frame to the second image frame, and matching segments of the second image frame to the first image frame; and
    (d) comparing an overlapped condition between the first and second segments in one of said image frames with newly visible portions in the other of said image frames to determine relative z-ordering between the first and second segments.

2. The method of claim 1, further comprising breaking any cyclical relationships.

3. The method of claim 1, wherein segments are each of substantially uniform color and are embodied in a plurality of geometries and areas.

4. The method of claim 1, wherein an error minimization technique is used in step (d).

5. A method of processing a video stream of image frames to determine relative z-ordering of segments therein, the method comprising:
    receiving original image data including a first frame comprising at least first and second regions and a second frame comprising at least first and second regions, wherein the second frame is temporally correlated to the first frame;
    matching the first region of the first frame with the first region of the second frame and the second region of the first frame with the second region of the second frame;
    creating first candidate image data wherein the first region occludes the second region;
    creating second candidate image data wherein the second region occludes the first region; and
    determining which of the first and second candidate image data is a better match to the original image data.

6. The method of claim 5, wherein pixel-by-pixel comparison and lowest average error computation is used to determine which of the first and second candidate image data is the better match.

7. The method of claim 5, wherein the first region is determined to be in front of (having lower z-order than) the second region if the first candidate image is the better match, and wherein the second region is determined to be in front of (having lower z-order than) the first region if the second candidate image is the better match.

8. The method of claim 5, wherein pair-wise z-order relationships are determined for at least three regions in the original image data.

9. The method of claim 8, wherein a cyclical relationship exists in the pair-wise z-order relationships, and further comprising canceling a weakest pair-wise z-order relationship.

10. The method of claim 9, wherein canceling the weakest pair-wise z-order relationship is repeated until there is no cyclical relationship in the pair-wise z-order relationships.

11. An apparatus for processing video image frames to determine relative z-ordering of image segments therein, the apparatus comprising circuitry configured to (a) receive original image data including a first frame comprising at least first and second regions and a second frame comprising at least first and second regions, wherein the second frame is temporally correlated to the first frame, (b) match the first region of the first frame with the first region of the second frame and the second region of the first frame with the second region of the second frame, (c) create first candidate image data wherein the first region occludes the second region, (d) create second candidate image data wherein the second region occludes the first region, and (e) determine which of the first and second candidate image data is a better match to the original image data.

12. The apparatus of claim 11, wherein the apparatus comprises a video encoder.

13. The apparatus of claim 11, wherein the apparatus comprises a video decoder.

\* \* \* \* \*